United States Patent [19]

Wilson

[11] 4,069,684
[45] Jan. 24, 1978

[54] PIPELINE RETARD, SUPPORT AND PROTECTION METHOD

[76] Inventor: Ernest I. Wilson, 192 S. First West, Nephi, Utah 84648

[21] Appl. No.: 657,434

[22] Filed: Feb. 12, 1976

Related U.S. Application Data

[63] Continuation-in-part of Ser. No. 595,973, July 14, 1975, which is a continuation-in-part of Ser. No. 413,747, Nov. 7, 1973, abandoned.

[51] Int. Cl.$^2$ .................. B29D 27/04; E04B 1/16
[52] U.S. Cl. ........................ 61/105; 61/106; 264/32; 264/45.5; 264/46.6; 264/DIG. 14
[58] Field of Search ............ 264/46.5, 46.6, 54, 264/106, 45.5, DIG. 14; 61/105, 72.2, 106

[56] References Cited

U.S. PATENT DOCUMENTS

| | | | |
|---|---|---|---|
| 1,671,679 | 5/1928 | Marston | 61/72.2 X |
| 2,602,764 | 7/1952 | Billingham | 61/106 X |
| 2,774,383 | 12/1956 | Kidd | 61/106 X |
| 3,229,441 | 1/1966 | Heffner | 264/46.6 X |
| 3,366,718 | 1/1968 | Komada | 264/54 X |
| 3,380,258 | 4/1968 | Young | 264/46.5 X |
| 3,421,328 | 1/1969 | Oosterbaan | 61/106 |
| 3,722,225 | 3/1973 | Empson | 61/105 |

OTHER PUBLICATIONS

Stengard; R. A., "Void Filling with Frothed Rigid Urethane Foam," Dupont Hylene Foam Bulletin, Wilmington, Del., E. I. DuPont de Nemours & Co., Inc., Jan. 16, 1961, pp. 1–8.
Knox, R. E. and R. A. Stengard, "Process Variables in Rigid Foam Frothing," DuPont Hylene Urethane Foam Bulletin, Wilmington, Del. E. I. DuPont de Nemours, Elastomer Chemicals Dept., Jan. 21, 1961, pp. 1–8.
Smith; Jerold B., "Frothing Rigid Urethane Foams," in *Plastics Technology*, Jan. 1964, pp. 35–37.
Zwolinski; Leon M., "Molded Integral-Skin Urethane Foam", in *SPE Journal*, Sept. 1969, vol. 25, pp. 24–27.

*Primary Examiner*—Philip Anderson
*Attorney, Agent, or Firm*—H. Ross Workman; J. Winslow Young

[57] ABSTRACT

A pipeline retard, support, and protection method wherein a fast-setting, expandable, organic spray foam is sprayed at spaced locations in a trench to create support pads and retards in the trench. The foam constituents are mixed in a spray apparatus and directed as a spray foam into the trench where it rapidly expands and stiffens into a layer of foam. Rapid expansion and corresponding rapid stiffening is believed to cause the cells in each layer of the foam structure to be elongated essentially normal to the plane of the layer. This cellular configuration in each layer imparts vertical strength and limited lateral flexibility to the structure. A plurality of layers of foam are sequentially formed in the trench to fabricate the desired structure. The placement of each layer is sequenced so as to permit a membrane to form on the surface of each layer for improved strength and inhibition of water penetration. The retards and/or support pads are created in the absence of forms or other foam molding means and each may be keyed to the trench surface for securement.

10 Claims, 4 Drawing Figures

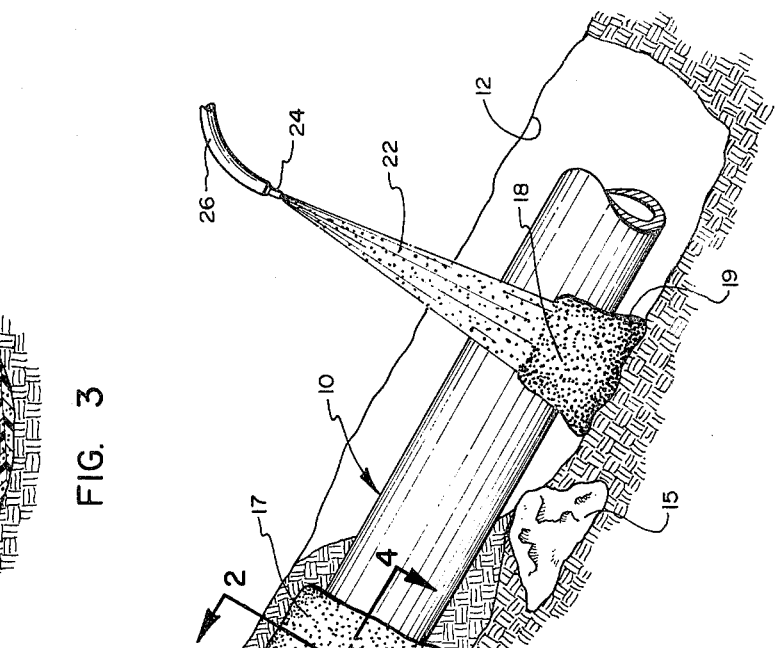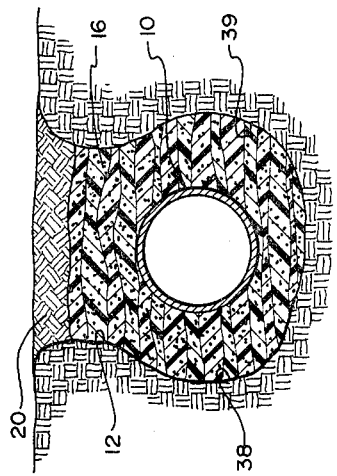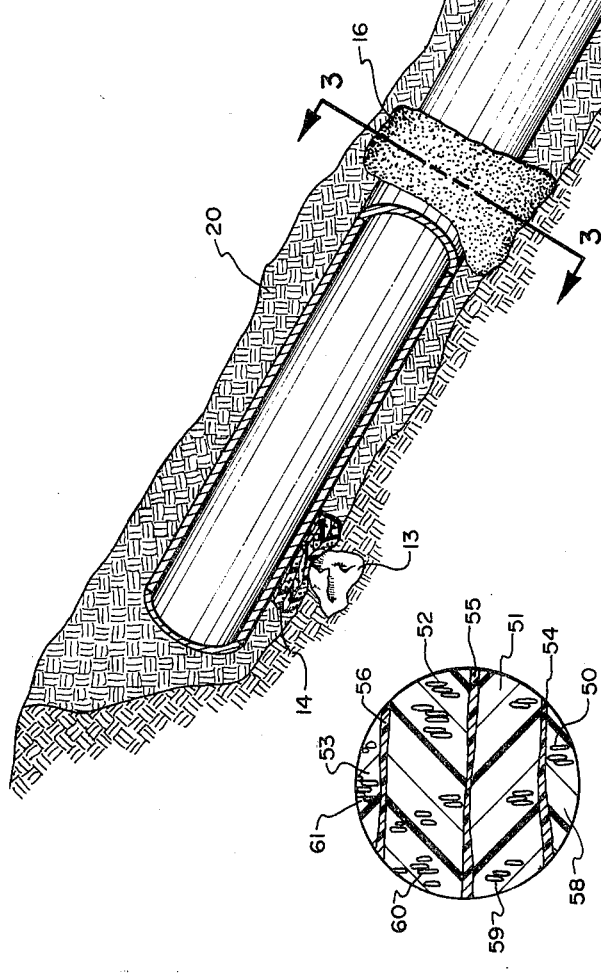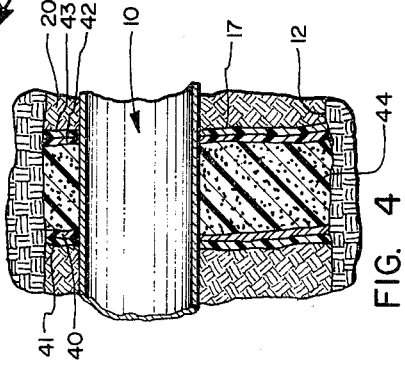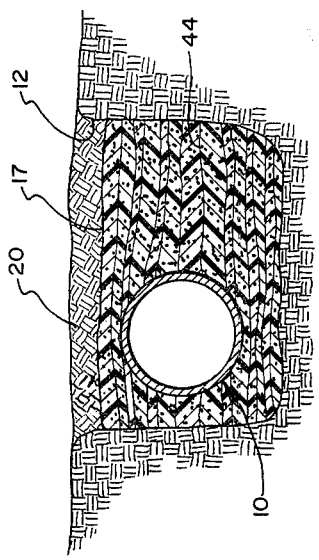

PIPELINE RETARD, SUPPORT AND PROTECTION METHOD

BACKGROUND

Related Application

This application is a continuation-in-part of copending application Ser. No. 595,973 filed July 14, 1975, which is a continuation-in-part of copending application Ser. No. 413,747 filed Nov. 7, 1973 and now abandoned.

FIELD OF THE INVENTION

This invention relates to an improved pipeline retard, support and protection method and more particularly to an improved method for securing, supporting and protecting a pipeline in a trench.

THE PRIOR ART

Retards are devices placed around a pipeline in a trench, substantially filling the void between the pipeline and the trench wall, to retard the percolation of water longitudinally along the trench through the earthen backfill. The retards thereby inhibit the consequent erosion of the protective earthen backfill from around the pipeline.

It is well known in the art of laying pipelines that any metallic pipe which is placed in a trench in the earth is subject to corrosion and also damage from contact with rocks in the trench. Corrosion and damage to the pipeline weakens the wall thereof and subsequently permits leakage. Discovery of leakage from a buried pipeline is troublesome and expensive because pipelines often extend for several hundred miles over rough terrain.

To reduce corrosion, pipelines are generally treated by coating and wrapping to protect the pipeline from the corrosive environment of a trench. However, particularly in long distance natural gas pipelines, the pipeline flexes in response to temperature fluctuations and changes in internal pressure. Unless the pipeline remains protected by the earthen backfill, flexure of the pipeline causes the pipeline and its protective coating to come into destructive contact with rocks in the trench. However, a recently filled trench contains a relatively friable earthen backfill which readily permits the infiltration and channeling of water with a resultant erosion of the backfill material. Erosion of the earthen backfill permits the pipeline to destructively contact rocks in the trench.

As a conventional protective measure, sandbags are used both as retards and to support the pipeline in the trench to protect the pipeline from contact with the trench walls. The trench is then backfilled with a substantially rock-free earth as an additional protective measure. The sandbag retards also serve to inhibit water from percolating longitudinally through the softer, more friable earthen backfill and eroding this protective earthen covering from the pipeline. Ordinarily, the required useful life for such a retard is about two years since in that time span the earthen backfill will have settled and have attained a degree of compaction similar to the adjacent soil. Thereafter, water percolation through the backfill is significantly reduced and the trench no longer acts as a channel for the water.

However, moisture promotes the rapid disintegration of the sandbag material so that water percolating through the backfill in the trench erodes both the sandbag contents and the protective earth covering from the pipeline. The pipeline and its coating thereafter become abraded and otherwise exposed to damage. This problem is extremely aggravated in areas of natural drainage and when the pipeline trench is inclined where it serves as a natural channel for runoff water. Sandbag support pads and retard systems are also expensive because of the time and labor required in filling and placing the same.

Other materials have been proposed for fabricating these retards including pour foam materials. Pour foams are those which are formulated and poured between form structures which structures control the direction of expansion of the foam. Such foam materials are generally used for thermal insulation purposes (see, for example, U.S. Pat. Nos. 3,722,225 and 3,380,258). However, to be an effective insulation this material must encase the entire structure being insulated and, therefore, consumes enormous quantities of foam.

The use of a foam material for stabilizing a foundation is also known (see, for example, U.S. Pat. No. 3,626,702). The foam extends the entire length of the structure and is used to completely fill the cavity beneath the stabilized structure.

Until this present invention, no method has been provided which accommodates facile formation of foam pipeline supports and retards in situ. In particular, no prior method discloses spraying a plurality of layers of an expandable, fast-setting organic spray foam into the trench to build the desired structure without forms. The foam structures thus formed have the unique characteristic of a degree of lateral flexibility while providing sufficient vertical strength to support and protect a pipeline in a trench. The retards are separated by backfill and inhibit water from channeling longitudinally through the backfill in the trench.

BRIEF SUMMARY AND OBJECTS OF THE INVENTION

The present invention advantageously provides a unique pipeline support and retard method to support and protect a pipeline from destructive contact with the walls and/or bottom of a trench. The retards also significantly inhibit erosion of the protective backfill from around the pipeline in the trench.

The support pads and retards are formed in situ by spraying a plurality of layers of a fast-setting, expandable, organic spray foam into the trench until a foam structure of the desired dimensions is created. The present method eliminates any requirement for foam forming devices to build a structure of a given dimension. The method also provides a foam structure having a limited degree of lateral flexibility while maintaining a desired degree of strength in the structure.

Accordingly, it is a primary object of the present invention to provide improvements in pipeline protection methods.

It is another object of the present invention to provide an improved method of forming a pipeline retard in situ from a fast-setting, expandable, organic spray foam.

An even still further object of this invention is to provide a method for fabricating support pads and retards for a pipeline in a trench wherein the structures are fabricated in the absence of forming structures.

Another valuable object is to provide a method for inhibiting water from percolating longitudinally through the backfill around a pipeline in a trench.

One still further object of this invention is to provide a foam retard having a degree of lateral flexibility while simultaneously having a desired degree of vertical strength.

These and other objects and features of the invention will be more fully understood from the following description and appended claims taken in conjunction with the accompanying drawings.

BRIEF DESCRIPTION OF THE DRAWINGS

FIG. 1 is a schematic view of a section of pipeline in an inclined trench with one wall of the trench broken away, the pipeline being partially cut away and illustrated as supported and protected by retards and support pads according to a preferred embodiment of the invention;

FIG. 2 is a cross-sectional view taken along lines 2—2 of FIG. 1;

FIG. 3 is a cross-sectional view taken along lines 3—3 of FIG. 1 of a typical retard configuration wherein the retard is keyed to the trench;

FIG. 4 is a cross section taken along lines 4—4 of FIG. 1; and

FIG. 5 is a schematic enlargement of a fragment of FIG. 2.

DETAILED DESCRIPTION OF THE PREFERRED EMBODIMENT

General

The construction of an underground pipeline commences with the preparation of the right of way and excavation of a trench in the right of way. Where possible, mechanized trenching apparatus is used to excavate the trench. This trenching apparatus functions well in most soils and moderate terrain to prepare a fairly uniform trench for the pipeline. However, in rock outcroppings and steep terrain other techniques and equipment are needed to excavate the trench including, for example, blasting and other mechanical digging apparatus. As a result, the trench becomes very irregular in surface contour resulting in large areas requiring backfill after the pipeline is emplaced in the trench.

Conventionally, a pipeline is assembled alongside the trench and is coated and wrapped prior to being lowered into the trench on a bed of earth or sandbag supports. Where possible, a pipeline is laid directly on the earthen floor of the trench providing the floor does not have rock outcroppings which would damage the pipeline and its covering. However, in rocky terrain it is necessary to support the pipeline above the floor of the trench. This is accomplished by building support pads at preselected locations in the trench. Support pads are spaced in the trench according to the load bearing requirements and terrain over which the pipeline passes. Retards are then built around the pipeline for the purposes set forth hereinbefore.

Generally, the required life expectancy for a retard system is only about two years since, after that time period, the earthen backfill material will have achieved a degree of compaction comparable to the adjacent soil. Furthermore, the pipeline right of way will have generally acquired a suitable growth of ground cover. Both of these natural occurences tend to minimize the erosion of the backfill from the trench.

The practice of the present invention involves the creation of support pads and retards in situ in the trench by the accretion of a plurality of layers of spray foam until the foam structure has been prepared. Importantly, no forms or other foam molding structures are required since the spray foam material rapidly foams and stiffens in a layer after being sprayed into position.

Spray foam is to be particularly distinguished from pour foam since spray foam is catalyzed to stiffen much more rapidly although the basic foam constituents may be similar. Spray foams are defined herein as expandable, fast-setting organic foam materials which cure or achieve approximately 75% of their ultimate physical characteristics in less than about 30 seconds after the foam ingredients have been mixed. Customarily, spray foams are formulated so as to cure to this state in less than about 10 seconds. Due to the rapidity with which these foams react, the ingredients are rapidly brought together in the mixing chamber of a pressurized spray apparatus and there rapidly mixed before being expelled therefrom as a spray under pressure. Since the ingredients are formulated to rapidly react, the foaming reaction is initiated immediately upon their introduction in the mixing chamber and commences while being expelled as a spray toward the area of deposition. However, the major foaming of the materials occurs after it has been deposited as a layer in the trench.

If pour foam were formulated with the same foaming characteristics as a spray foam, the rapid foaming and stiffening action of the foam would result in large chunks of foam forming as the foam material was being poured. This would cause discontinuities in the foam density and even voids where the chunks would block the entry of poured foam material. Accordingly, the structure thus created would have very poor strength and flexibility characteristics.

Spray foam lends itself exceptionally well to the present invention since each structure is fabricated by the accretion of a plurality of layers of spray foam under the direction of an operator. Thus, spray foam requires no form structures and can be directed to the desired location and in the amounts desired.

Rapid foaming and curing of the spray foam material is believed to cause the individual cells in each foam layer to expand toward the area of least resistance which is the upper segment or portion of the foam material most recently deposited. Resistance to cell expansion is encountered laterally both by the outward pressure exerted by adjacent cells and the rapidly curing matrix surrounding the cells. Accordingly, the cells tend to be elongated with the longitudinal axis essentially normal or generally perpendicular to the plane of the layer of foam. Elongation of the cellular structure is believed to impart a significant degree of strength to the foam in the direction of the axis of elongation while causing the foam to have a limited degree of flexibility in a direction transverse to the axis of elongation.

Each layer of foam also rapidly forms a skin or membrane on its surface since the surface more rapidly releases the heat of reaction of the foam ingredients and the gas in the cells therein either escapes or has less opportunity to expand into a discrete cellular mass. This integral skin or membrane imparts a degree of strength and toughness to the layer in addition to making the layer more impervious to fluid penetration.

To a certain extent, foam expansion is a function of heat retention by the foam material. The reaction between the foam ingredients is very exothermic which raises the temperature of the blowing gas causing the discrete bubbles of the same to exert a greater outward pressure during expansion. Accordingly, excessively thick layers of foam material tend to trap the generated heat and produce a larger cell structure. Excessive heat retention also causes charring of the foam. Larger size cellular structure and charring of the foam both result in a degradation of physical characteristics of the foam structure.

Importantly, I have discovered that because of the characteristics of spray foam, it must be injected and formed as layers to (1) allow the heat of reaction to dissipate, (2) form the uniform cellular structure having the small, elongated cells, and (3) form the membrane on the surface of each layer if the foam structure is to have the desired physical properties. This is easily done by directing the spray in a sweeping motion back and forth across the area receiving the foam. The rate of foam material delivery to the spray and the rate of the sweeping movement of the spray determine the quantity of foam in each layer. Membrane or integral skin formation occurs rapidly and usually in the time taken to sweep the spray across the length of a retard spanning the void of the trench. Otherwise, the spray apparatus can be controlled by the triggering mechanism to provide the necessary momentary delay between layer formation.

Reference is now made to the drawings wherein like parts are designated with like numerals throughout. Although any type pipeline system may advantageously benefit from this invention, for ease of presentation, the discussion herein will be directed toward a natural gas pipeline.

Referring to FIG. 1, a section of a pipeline 10 is shown in a trench 12. Pipeline 10 includes a conventional pipeline covered with a conventional protective coating. Pipeline 10 is initially supported by a plurality of spaced foam support pads 14, only one of which is shown herein as an independent unit. Support pad 14 is formed in situ from an accretion of layers of fast-setting, expandable, organic spray foam material in the empty trench. Support pad 14 serves, to an extent, as a retard in that it both supports pipeline 10 and inhibits water from channeling longitudinally along the bottom of trench 12 beneath pipeline 10. Support pad 14 and similar support pads (not shown) are generally created in areas of rocks 13 and 15 and the like to support pipeline 10 above rocks 13 and 15 to prevent damage to pipeline 10.

The spray foam may be of any suitable spray type; for example, a conventional two component foam including isocyanate and a polyol mixture mixed with a suitable catalyst and blown with Freon. This isocyanate foam is characterized in part by noticeable expansion immediately prior to setting. The expanded foam product may have a volume as much as 20 to 30 times the original volume of the foam components. This expandable and fast-setting spray foam is commercially available from Utah Foam Products, Salt Lake City, Utah, under the designation 120-3S. The identified expandable foam results from the chemical reaction of the two components when mixed in a suitable nozzle 24. A suitable nozzle is also available from Utah Foam Products. The foam is preferably sprayed under pressures of about 800–1100 psi from a two component, self-cleaning nozzle or gun with a capacity of 15 pounds per minute. Greatest success is found when the foam is sprayed in ambient temperatures not less than 40° F (4.4° C).

Foam components are each separately supplied to nozzle 24 by hose 26 (FIG. 1) from sources of material (not shown). The mixed foam components or spray 22 is then directed into the desired location in trench 12 by an operator (not shown). The width of the spray pattern used to form the retard or support pad may be, in part, selectively regulated by using a spray nozzle 24 which ejects a different width spray 22. Various spray nozzle apparatus are commercially available and can be suitably adapted for the purposes set forth herein. Regardless of the width of spray 22, movement and triggering of spray 22 are particularly useful in regulating the thickness of the various layers in the foam structure.

One presently preferred technique for practicing the method of this invention involves an operator (not shown) grasping the nozzle 24 and directing spray 22 into the empty trench 12 to build a layer of foam laterally transecting the floor of trench 12. The spray foam rapidly expands and cures into about 75% of its final physical properties in about 10 seconds or less and also forms a membrane of essentially cell-free matrix material on the surface thereof. The deposition of a relatively thin layer of foam (preferably about ½ inch to 3 inches thick) results in a foam material having superior physical properties for the present application. Importantly, it is presently believed that the relatively thin layer causes each cell of the cellular structure to be generally elongated along an axis essentially perpendicular to the plane of the layer as set forth hereinbefore. Furthermore, by sweeping the spray in a back and forth motion or by pausing momentarily between layers the operator (not shown) can form a membrane on the surface of each layer, also as set forth hereinbefore.

Each support pad can be, therefore, selectively formed in situ with the desired dimensions. For example, each support pad may have a width (measured along the longitudinal axis of the trench) of about 8 inches to about 20 inches or more with 12 inches to 16 inches being the customary width. Support pads are usually spaced about 20 to 150 feet from the adjacent support pad, depending upon various factors, as previously discussed. The height of support pad 14 usually varies anywhere from about 6 inches to about 30 inches with about 12 to 16 inches being the customary height, also depending upon numerous factors as set forth hereinabove. Minor deviations in support pad height does not create difficulties because placement of the pipeline on the support pads tends to compress each support pad a few inches, generally about 2 inches. Thus, support pad 14 should have sufficient height so as to prevent the lowered pipeline 10 from contacting rocks 13 and 15.

Importantly, each support pad 14 is fabricated to transect the entire width of the trench 12 since the subsequently lowered pipeline 10 may rest at any portion of trench 12 other than its centerline (as schematically illustrated in FIG. 2) and it is impossible to predict in advance the final location of pipeline 10 in trench 12.

After pipeline 10 has been lowered into trench 12 on support pads 14, a plurality of retards, indicated herein as retards 16–18, are fabricated to encapsulate pipeline 10 and transect trench 12. Retard formation commences with the accretion of several layers of foam material in the void underneath pipeline 10 or by building directly upon a support pad as the construction of retard 18 may be envisioned. The operator (not shown) thereafter directs spray 22 from nozzle 24 to build the desired number of layers of foam material on each side of pipeline 10 to completely fill the void at the position of the retard between pipeline 10 and walls of trench 12. After the retard void on each side of pipeline 10 has been filled with layers of spray foam, the level of the retard is raised to a few inches below the grade of the right of way as shown by retards 16 and 17. Clearly, retards 16–18 can be selectively fabricated so as to be less than, equal to, or greater than the height of pipeline 10 although it is presently preferred that it fill the transected portion of the trench to within a few inches below the grade level for the backfilled trench.

Advantageously, spray 22 may be directed to a side surface of trench 12 to create better adherence between retard 18 and the wall of trench 12 than would be obtained if each foam layer were allowed to only expand into the trench wall. This results because freshly sprayed foam material has a high degree of tackiness which rapidly disappears during the rapid membrane formation and curing of the foam layer. Furthermore, since the strength characteristics are greater in a direction perpendicular to the plane of the layer, this latter technique permits the pipeline to be more adequately supported against movement toward a trench wall during flexure of the pipeline.

Each retard has a thickness of about 10 to 24 inches as measured along the axis of the pipeline with a usual thickness of about 14 to 20 inches. By way of example, an 18 inch pipeline in a correspondingly sized trench may be provided with a retard about 18 inches thick (as measured along the axis of pipeline 10) and may include approximately 50 pounds of foam. Customarily, retards 16-18 are spaced about 40 to 300 feet with closer spacing being dictated by other factors such as adjacent stream beds, canals, and the like. Additionally, a more steeply inclined trench requires more closely spaced and thicker retards to restrain the backfill.

Backfill 20 is placed around pipeline 10 in trench 12 after retards 16 and 17 have suitably cured, usually anywhere from 1 to 24 hours. Thus, a discrete quantity of earthen backfill 20 separates each of retards 16 and 17.

Referring now more particularly to FIG. 2, the illustrated retard 17 closely conforms to and circumscribes pipeline 10. It is also highly advantageous that the retards conform to the bottom and walls of trench 12. Thus, essentially the entire periphery of trench 12 is secured against longitudinal percolation of water. Accordingly, resultant erosion of the protective earthen covering of pipeline 10 will be significantly minimized. FIG. 2 also more clearly demonstrates the layering phenomena discovered to be valuable in the application of a suitably formulated and applied spray foam material.

Referring to FIG. 3, an undercut portion or notch in at least one wall of trench 12 serves as a retard locking mechanism or recess as shown at 38 and 39. When recesses 38 and 39 are filled with the expanding foam, the foam hardens into retard 16 which interlocks with the trench wall to securely hold the position of retard 16 in trench 12 against movement due to water percolation and downhill settling of backfill 20. Alternatively, the retard locking may be in the form of a vertically extending slot or keyway traversing the entire height of the trench 12. The purpose for the locking mechanism is to prevent the longitudinal movement of the retard in the trench with subsequent loss of sealing and support effectiveness.

Keying or locking of the retards may also be accomplished by spraying foam into naturally occurring discontinuities or cavities in the trench wall which will function similarly to undercut portions 38 and 39. Locking the retards to the trench wall has been found most desirable where the trench is inclined although retard locking may be deleted on level terrain. Generally, retards are sparsely used in pipeline trenches in level ground. However, trenches through swampy areas may require the use of an increased number of retards per unit length of pipeline, depending upon conditions encountered. In both cases, the keyed retards resist disintegration and displacement by water percolation and the like.

As shown, retards 17 and 16 (FIGS. 2 and 3) preferably circumscribe all of the circumference of a longitudinal section of pipeline 10 although other retard heights can be used.

Referring now more particularly to FIG. 4, retard 17 is shown as being fabricated with a central core 44 which is a plurality of discrete foam layers (see FIG. 2) having a facing on each side of a plurality of foam layers 40-43. Layers 40-43 impart a degree of water imperviousness to the retard 17 and also contribute a degree of additional strength to retard 17. Although two layers are shown on each face of retard 17, other layer combinations could be used to impart the desired characteristics to retard 17. Each layer 40-43 on the face of the retard is formed after at least several horizontal layers 44 have been constructed. The layers 40-43 may be sprayed on the face of the retards in essentially the same manner in which the layers 44 are formed.

Referring now more particularly to FIG. 5, a greatly enlarged, schematic illustration of the layering and cellular construction of the present invention. It should be particularly emphasized that this schematic illustration is set forth for purposes of illustration only since the actual foam structure has a cellular density that has been estimated to be several hundred thousand cells per cubic inch of foam structure. In particular, FIG. 5 is set forth herein to illustrate schematically the internal structure of the foam support pads and retards created by the method of this invention. For example, a plurality of foam layers 50-53 have been created, each with membranes or integral skins 54-56, respectively where applicable, formed thereon. Each layer 50-53 includes a plurality of elongated cells 58-61 respectively created therein. Clearly, there will also be a relatively limited number of cells (not shown) in membranes 54-56 by nature of the membrane formation since each is formed on the surface as an integral part of the respective underlying foam layer. However, since a primary feature of this invention is the formation of a foam structure fabricated from a plurality of discrete layers, each layer having a membrane or integral skin on the surface thereof, the inclusion of a relatively few cells in the membrane or integral skin is considered to be of little consequence in this invention.

Cells 58-61 tend to elongate during formation in the direction of least resistance to expansion. Furthermore, the action of gravity on matrix stiffening and cell formation will also tend to cause the cells to elongate generally vertically. However, it is believed that due to the rapidity with which the foam achieves a substantial portion of its ulltimate stiffness that this latter phenomena of gravity is quite limited in its effect on cell elongation, particularly for foam layers which are other than horizontal. Accordingly, in each layer there is believed to be a tendency for the cells to elongate along an axis generally normal to the plane of the layer although not necessarily precisely perpendicular thereto.

In practice, after the trench 12 has been excavated and before the pipeline 10 is laid therein, a plurality of support pads 14 are created in the base of the trench 12, where necessary, to support the pipeline above rocks 13 and 15 and the like. Future locations for placement of foam retards may also be predetermined. After the pipeline 10 has been laid in the trench, foam is sprayed into the trench at the desired locations to create retards 16–18. It should be particularly noted that retard 18 may be fabricated as an integral part of a previously fabricated support pad 19. In this instance, support pad 19 is prepared similar to support pad 14 so as to collectively support pipeline 10 above rocks 13 and 15, it being understood that a plurality of other support pads (not shown) have also been placed at suitable locations in trench 12. After pipeline 10 has been placed in trench 12, retard 18 is created so as to selectively incorporate support pad 19 therein.

Importantly, each support pad and/or retard is fabricated in situ and, particularly, in the absence of foam shaping devices. In particular, the fabrication of the particular foam structure, whether support pad or retard, commences with the operator (not shown) directing spray 22 into the trench 12 at the desired location. By controlling the movement and triggering of spray 22 the operator creates a layer of foam in trench 12. The foam layer rapidly expands and commences to cure within a few seconds. Additionally, within that time period, a membrane or skin forms on the layer to impart a substantially water impervious surface to the foam layer and also assists in making the foam structure stronger. Strength is also obtained by permitting the cells in each layer to elongate before placing additional foam on the layer. The generally elongated cellular structure also appears to cause the foam structure to have a greater degree of flexibility in a direction parallel to the plane of the layer. Accordingly, the operator (not shown) easily and quicky constructs a support pad and/or retard having the desired strength and flexibility features so as to suitably support and protect a pipeline in a trench.

Backfill 20 is generally composed of a friable earth mass which was previously removed during construction of trench 12. Upon its replacement, backfill 20 remains more loosely compacted than the surrounding earth. It is only after the passage of a suitable time period that it settles and achieves a degree of compaction comparable to the adjacent earth. Until that time, retards 16–18 are necessary to restrain percolation of water therethrough and the consequent erosion of backfill 20. Accordingly, each retard is separated from an adjacent retard by a quantity of backfill and each retard also supports the quantity of backfill above it to inhibit the same from becoming saturated with water and slumping.

Each retard will, therefore, be fabricated according to its anticipated load condition which is a function of the terrain through which the pipeline is placed. Generally, steeper terrain will require more frequent spacing of retards with each retard being fabricated somewhat thicker so as to withstand the expected load conditions. Increased retard thickness is readily attained by suitably directing spray 22 in the desired locations as the retard is being constructed. Additionally, each retard may have a facade of additional layers of foam placed on the sides thereof to increase the thickness of the retard. The foam layers also impart a membrane surface to the sides of the retard for improved water resistance by the foam structure.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for forming a retard for a pipeline in a trench comprising the steps of:
   obtaining the ingredients for an expandable, fast-setting, organic spray foam;
   mixing the ingredients together while expelling the mixed ingredients under pressure from a spray apparatus;
   directing the spray of mixed foam ingredients into a trench in the void existing between a pipeline and the trench surface and for an incremental distance in the void along the length of the pipeline and thereby building at least a first layer of foam in the trench; and
   forming additional layers of foam on the first layer of foam in the trench until the void between the pipeline and the trench and for said incremental distance in the void along the length of the pipeline has been filled with a foam retard structure fabricated from a plurality of layers of foam, said forming step being performed in the absence of a form structure for the foam.

2. A method for forming at least one foam retard transecting the void in a trench between a pipeline and the trench surface and for an incremental width distance in the void along the length of the pipeline, the retard serving to inhibit water from percolating longitudinally through an earthen backfill in the trench, the retard being fabricated in situ in the absence of forms and from a plurality of layers of a fast-setting, expandable, organic foam material wherein discrete cells in each foam layer are elongated along an axis generally perpendicular to the layer so as to impart a degree of lateral flexibility to the retard while maintaining the transverse compressive strength of the layer, comprising the steps of:
   excavating a trench for a pipeline;
   placing the pipeline in the trench in spaced relationship to the trench surfaces according to conventional techniques thereby forming a void between the pipeline and the trench surfaces; and
   forming the foam retard in the trench, comprising the steps of:
     obtaining the components for a fast-setting, expandable, organic foam material;
     separately conducting the components under pressure to a mixing chamber of a pressurized spray apparatus;
     rapidly mixing the components in the mixing chamber of the pressurized spray apparatus;
     spraying a layer of the mixed components into an incremental length of the void between pipeline and the trench, said incremental length corresponding to the width of the retard, the foam expanding and stiffening to form a layer of rigid foam;
     permitting an integral skin to form on each layer; and
     repeating the spraying and permitting successive layers on each previous layer until the foam retard structure has been fabricated.

3. A method as defined in claim 2 wherein the forming step comprises building additional strength into the retard by spraying at least one layer of foam on the sides of the retard to increase the thickness dimension of the retard as measured along the length of the pipeline.

4. A method for forming a retard for a pipeline in a trench, the trench having a width to accommodate a pipeline, the retard having a discrete thickness along the length of the axis of the pipeline, the retard also having a greater degree of flexibility in a lateral direction and a lesser degree of flexibility vertically, comprising the steps of:

mixing the components of a fast-setting, expandable, organic foam in a mixing chamber of a spray apparatus, the components being introduced into the mixing chamber under an elevated pressure;

expelling the mixed components as a spray from the spray apparatus;

directing the spray of mixed components into a discrete length of the void between the pipeline and the trench until a layer of foam is obtained, the discrete length corresponding to the width of the layer, the foam layer expanding and setting during accretion;

permitting the cells in each layer of foam to become elongated generally perpendicularly to the plane of the layer to impart a degree of vertical strength and a degree of lateral flexibility to the retard; permitting an integral skin to form on the layer; and building a retard by suitably repeating the directing and forming steps until a retard has been created in situ in the trench.

5. A method as defined in claim 4 wherein the directing step comprises spraying the fast-setting, expandable organic foam into the trench and expanding each layer of foam in less than ten seconds thereby eliminating any requirement for foam forming structures.

6. A method as defined in claim 4 wherein the directing step includes extending the length of the retard to conform to the width of the trench by directing the spray across the width of the trench.

7. A method for supporting a pipeline above the bottom of a trench comprising the steps of:

excavating a trench;

obtaining the ingredients for a expandable, fast-setting, organic spray foam material;

rapidly mixing the ingredients to form a foam material and expelling the foam material from a spray apparatus as a spray of foam material;

building a plurality of support pads in the trench, each support pad spaced a discrete distance from the other, each support pad being formed by directing the spray into the bottom of the trench at spaced locations to form at least one layer of foam material as a band having a length transecting the bottom of the trench and a width corresponding to an incremental distance along the axis of the trench;

allowing the foam material of the layer to rapidly expand into an expanded layer having vertically elongated cells;

developing an integral skin on the surface of each layer before spraying a succeeding layer on the previous layer; and placing the pipeline in the trench on the support pads, the support pads supporting the pipeline above the bottom surface of the trench.

8. A method for protecting a pipeline in a trench comprising the steps of:

excavating a trench;

obtaining the ingredients for an expandable, fast-setting, organic spray foam material;

transferring the foam ingredients to a foam spray apparatus;

mixing and spraying the foam ingredients from the spray apparatus;

directing the spray into a trench and forming a first layer of organic foam material in the trench;

allowing the foam material to expand and at least partially cure;

forming at least a second layer of foam on the first layer to build a support pad for the pipeline, the support pad having a length transecting the width of the bottom of the trench and having a width which is an incremental distance of the longitudinal axis of the trench;

building a plurality of support pads at spaced locations in the trench with each support pad separated a discrete distance from the other by repeating the directing, allowing, and forming steps at said spaced locations along the trench;

lowering the pipeline in the trench onto the support pads, the support pads supporting the pipeline above the bottom of the trench;

fabricating a plurality of retards in the trench to impede the longitudinal percolation of water through an earthen backfill in the trench, each retard filling a discrete increment of the length of the void in the trench between the pipeline and the trench surface, each retard being prepared by spraying a plurality of layers of foam material into the trench while permitting each layer to at least partially cure thereby building each retard in situ in the trench in the absence of forming structures; and backfilling the remaining void between spaced retards in the trench with earth, each retard thereby being separated from each adjacent retard by an earthen backfill each retard thereby serving to inhibit water from percolating longitudinally through the earthen backfill along the length of the pipeline.

9. A method for inhibiting erosion of earthen backfill from around a pipeline in a trench wherein the pipeline has been previously assembled adjacent a trench excavated in a right of way according to conventional pipeline construction techniques, the method comprising the steps of:

obtaining the ingredients for an expandable, fast-setting, organic spray foam material;

delivering the ingredients to a mixing chamber of a spray apparatus;

mixing the ingredients while expelling the mixed ingredients from the spray apparatus as a spray of organic foam material;

building a plurality of support pads at spaced locations in the trench, each support pad having a length substantially corresponding to the width of the bottom of the trench and a width corresponding to an incremental distance of the longitudinal axis of the trench comprising the steps of:

directing the spray into the trench at each location to form at least one layer of foam material transecting the bottom surface of the trench, the foam material in each layer rapidly expanding while forming generally elongated cells essentially perpendicular to the plane of each foam layer; and permitting an integral skin to form on the top surface of each layer by pausing momentarily before directing the spray thereon to form a next succeeding layer;

placing the pipeline in the trench on the support pads, the vertically elongated cellular structure and membrane surfaces in the support pads imparting increased vertical strength to the support pads, the support pads supporting the pipeline above the bottom surface of the trench;

retarding the erosion of backfill from around the pipeline in the trench by forming a plurality of spaced retards in situ in the trench, each retard having a width along the length of the pipeline an incremental length of the pipeline, forming each retard in situ comprising the steps of:

directing the spray into the void between the pipeline and the trench surface thereby forming a layer of foam material, the foam material rapidly expanding while forming a cellular structure having cells elongated generally perpendicularly to the layer;

permitting an integral skin to form on the outer surface of the layer by pausing momentarily before directing the spray thereon to form a next succeeding layer; and repeating the directing and skin forming steps until the retard has been formed in situ in the trench in the absence of form structures, the retard transecting the void in the trench between the pipeline and the trench between the pipeline and the trench surfaces and filling the transected portion of the trench to an incremental distance below the grade of the right of way for the trench; and separating each retard from an adjacent retard by backfilling the trench, the retards inhibiting the percolation of water through the backfill longitudinally along the trench.

10. A method as defined in claim 9 wherein the retarding step further comprises combining a retard with a support pad by building a retard on a support pad and thereby filling a portion of the void in the trench above the support pad with the foam material.

* * * * *

UNITED STATES PATENT OFFICE
CERTIFICATE OF CORRECTION

Patent No. 4,069,684  Dated January 24, 1978

Inventor(s) Ernest I. Wilson

It is certified that error appears in the above-identified patent and that said Letters Patent are hereby corrected as shown below:

Column 14, line 9, delete "trench between the pipeline and the".

Signed and Sealed this

Twenty-seventh Day of June 1978

[SEAL]

Attest:

RUTH C. MASON  
Attesting Officer

DONALD W. BANNER  
Commissioner of Patents and Trademarks